(12) United States Patent
Wang et al.

(10) Patent No.: US 9,450,463 B2
(45) Date of Patent: Sep. 20, 2016

(54) PHASE WINDING AND CONNECTION METHODS FOR THREE PHASE DYNAMOELECTRIC MACHINES

(71) Applicant: Emerson Electric Co., St. Louis, MO (US)

(72) Inventors: Wierong Wang, Chesterfield, MO (US); Vincent Fargo, St. Charles, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 372 days.

(21) Appl. No.: 14/071,089

(22) Filed: Nov. 4, 2013

(65) Prior Publication Data
US 2014/0127056 A1    May 8, 2014

Related U.S. Application Data

(60) Provisional application No. 61/722,344, filed on Nov. 5, 2012.

(51) Int. Cl.

| | |
|---|---|
| H02K 3/00 | (2006.01) |
| H02K 3/04 | (2006.01) |
| H02K 3/28 | (2006.01) |
| F04C 23/02 | (2006.01) |
| H02K 3/52 | (2006.01) |
| F04C 29/00 | (2006.01) |
| F04C 18/02 | (2006.01) |

(52) U.S. Cl.
CPC ............... *H02K 3/28* (2013.01); *F04C 23/02* (2013.01); *H02K 3/522* (2013.01); *F04C 18/0215* (2013.01); *F04C 29/0085* (2013.01); *H02K 2203/06* (2013.01)

(58) Field of Classification Search
CPC .................................. H02K 3/00; H02K 3/28
USPC .......................... 310/179, 198, 203, 206, 207
See application file for complete search history.

(56) References Cited

U.S. PATENT DOCUMENTS

| | | | | |
|---|---|---|---|---|
| 2005/0242677 | A1* | 11/2005 | Akutsu | .............. H02K 3/28 310/179 |
| 2009/0251024 | A1* | 10/2009 | Huppunen | ............ H02K 29/03 310/195 |
| 2010/0127591 | A1* | 5/2010 | Court | ..................... H02K 3/28 310/202 |

* cited by examiner

*Primary Examiner* — Jose Gonzalez Quinone
(74) *Attorney, Agent, or Firm* — Harness, Dickey & Pierce, P.L.C.

(57) ABSTRACT

A stator having a first set of phase windings formed by wrapping a conducting wire in a first direction about first, second, and third teeth, a second set of phase windings formed by wrapping, separately in a second direction opposite the first direction, the conducting wire about fourth, fifth, and sixth teeth, a first interconnect wire extending between the winding on the first tooth and the winding on the fourth tooth, a second interconnect wire extending between the winding on the second tooth and the winding on the fifth tooth, a third interconnect wire extending between the winding on the third tooth and the winding on the sixth tooth, and a connection that connects the first, second, and third interconnect wires together.

7 Claims, 9 Drawing Sheets

PHASE WINDING AND CONNECTION METHODS FOR THREE PHASE DYNAMOELECTRIC MACHINES

CROSS-REFERENCE TO RELATED APPLICATION

This application claims the benefit of U.S. Provisional Application No. 61/722,344 filed Nov. 5, 2012. The entire disclosure of the above application is incorporated herein by reference.

FIELD

The present disclosure relates to phase winding and connection methods for dynamoelectric machines.

BACKGROUND

This section provides background information related to the present disclosure which is not necessarily prior art.

Dynamoelectric machines such as electric motors and generators convert electric energy into mechanical energy, or vice versa.

Electric motors can be classified into two types: single-phase motors and polyphase motors. Single phase motors are driven by a single phase AC power source, whereas polyphase motors are driven by a polyphase AC power source, which is typically a three-phase AC power source. For purposes of this disclosure, a motor driven by a single phase AC power source is a single-phase motor, even if the motor includes multiple windings such as a main winding and an auxiliary/start winding. In some applications, three phase electric power is highly desirable for use with electric motors because it allows the motor to be more compact, less costly, more efficient, and have less vibration than similar horse power single phase motors.

One advantage of balanced three phase power is that it does not require a neutral wire. Thus, all three conducting wires may be coupled together to form a neutral connection. In many three phase electric motors, the neutral connection is created by connecting a neutral wire from each phase winding together at a single point. For motors with many phase windings (e.g. 6, 9, or 12 windings) or large diameter conducting wires, this connection may be bulky or hard to manufacture. This is because the connecting requires grouping many wires together and then connecting them. Furthermore, connecting a mass of wires of this size, in many instances, requires welding or melting which may be time consuming and expensive.

SUMMARY

This section provides a general summary of the disclosure, and is not a comprehensive disclosure of its full scope or all of its features. A stator for a three phase dynamoelectric machine is disclosed and claimed. The stator includes a stator core having a plurality teeth radially distributed about a central axis and axially opposing ends. A first and second set of three adjacent phase windings are included. The first set of phase windings is formed by wrapping a conducting wire in a first direction about the first, second, and third teeth in the plurality of teeth. The second set of three adjacent phase windings is formed by wrapping, separately in a second direction opposite the first direction, the conducting wire about the fourth, fifth, and sixth tooth in the plurality of teeth. First, second, and third interconnect wire all located on one of the axial ends and connect the phase windings. Specifically, the first interconnect wire extends between the winding on the first tooth and the winding on the fourth tooth. The second interconnect wire extends between the winding on the second tooth and the winding on the fifth tooth. The third interconnect wire extends between the winding on the third tooth and the winding on the sixth tooth. The stator further includes a connection that connects the first, second, and third interconnect wires together. The connection is located on the same end as the first, second, and third interconnect wires in an area where the wires are adjacent to each other.

In some embodiments of the present disclosure, the stator includes a lead wire extending from each phase winding on the axial end of the stator core opposite the interconnect wires. The lead wires may be coupled together such that the stator includes three pairs of parallel phase windings. Depending on the embodiment, the lead wires may be coupled to the phase winding or formed from the conducting wire. In embodiments having three pairs of parallel phase windings, one of the windings in each winding pair may be indexed 180 degrees from the other winding in the pair.

Alternative embodiments of the stator described above may include a third set of three adjacent phase windings formed by wrapping, separately in the first direction, the conducting wire about a seventh, eighth, and ninth tooth. In this embodiment, a forth interconnect wire extends from the phase winding on the seventh tooth. A fifth interconnect wire extends from the winding on the eighth tooth, and a sixth interconnect wire extends from the winding on the ninth tooth. Each of the fourth, fifth and sixth interconnect wires are located on the same axial end of the stator as the first, second and third interconnect wires. This embodiment further includes a second and third connection. The second connection connects the fourth, fifth, and sixth interconnect wires together, and the third connection to connect the second, third, and forth interconnect wires together.

In yet another embodiment of the stator for a three phase dynamoelectric machine, the stator includes at least three equivalent sets of three adjacent phase windings. Each set of three adjacent phase windings includes a conducting wire wrapped around i) its first tooth in a first direction to form a first winding, ii) its second tooth in a direction opposite the first direction to form a second winding, and iii) its third tooth in the first direction to form a third winding. A first interconnect wire connects the first winding and the second winding. A second interconnect wire extending from the third winding, and a connection connects the first and second interconnect wires. The connection being located on one of the first or second axial ends in an area where the first and second interconnect wires are axially adjacent to each other.

In some embodiments, the stator may include an end cap including a body portion with an outboard wall. The end cap may be located on same axial end as the interconnect wires. A portion of the interconnect wires may be located on the outboard wall.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the use of terms "Phase", "P1", "P2", and "P3" as a convention to designate electrical conductors in polyphase system is for illustrative purposes only; the conductors could be re-labeled as long as there is a consistent interpretation of the phases.

Figure 1:
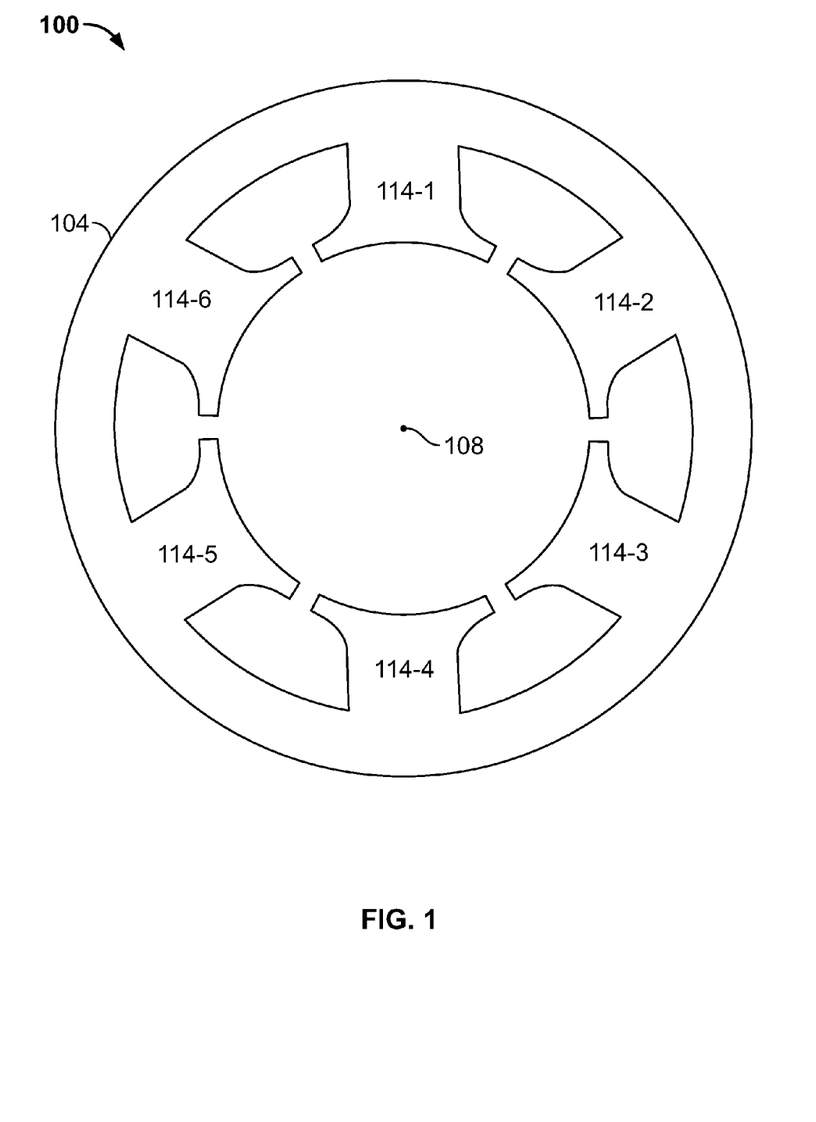
FIG. 1 is a cross sectional view of an example of a six tooth stator.
Figure 2:
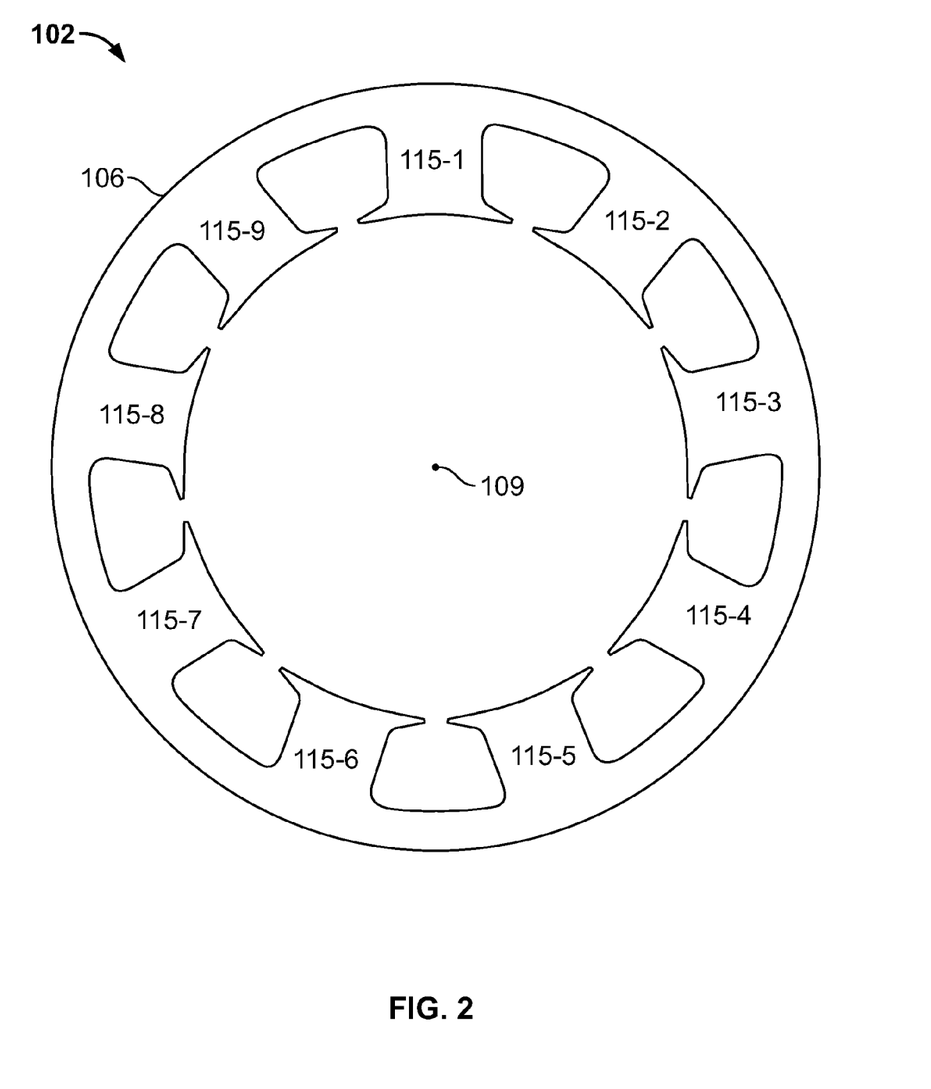
FIG. 2 is a cross sectional view of an example of a nine tooth stator.

FIGS. 1 and 2 illustrate exemplary cross sections of two stators 100 and 102. The stators 100 and 102 include stator cores 104 and 106. The stator cores 104 and 106 each include, respectively, a central axis 108 and 109 and two axially opposing ends 110 and 112 and 111 and 113 (shown in FIGS. 4 through 7). A plurality of teeth 114-1 through 114-6 and 115-1 through 115-9 are radially distributed about each stators central axis 108 and 109. For each stator core 104 and 106, each tooth has roughly the same cross sectional size and shape.

Figure 3:
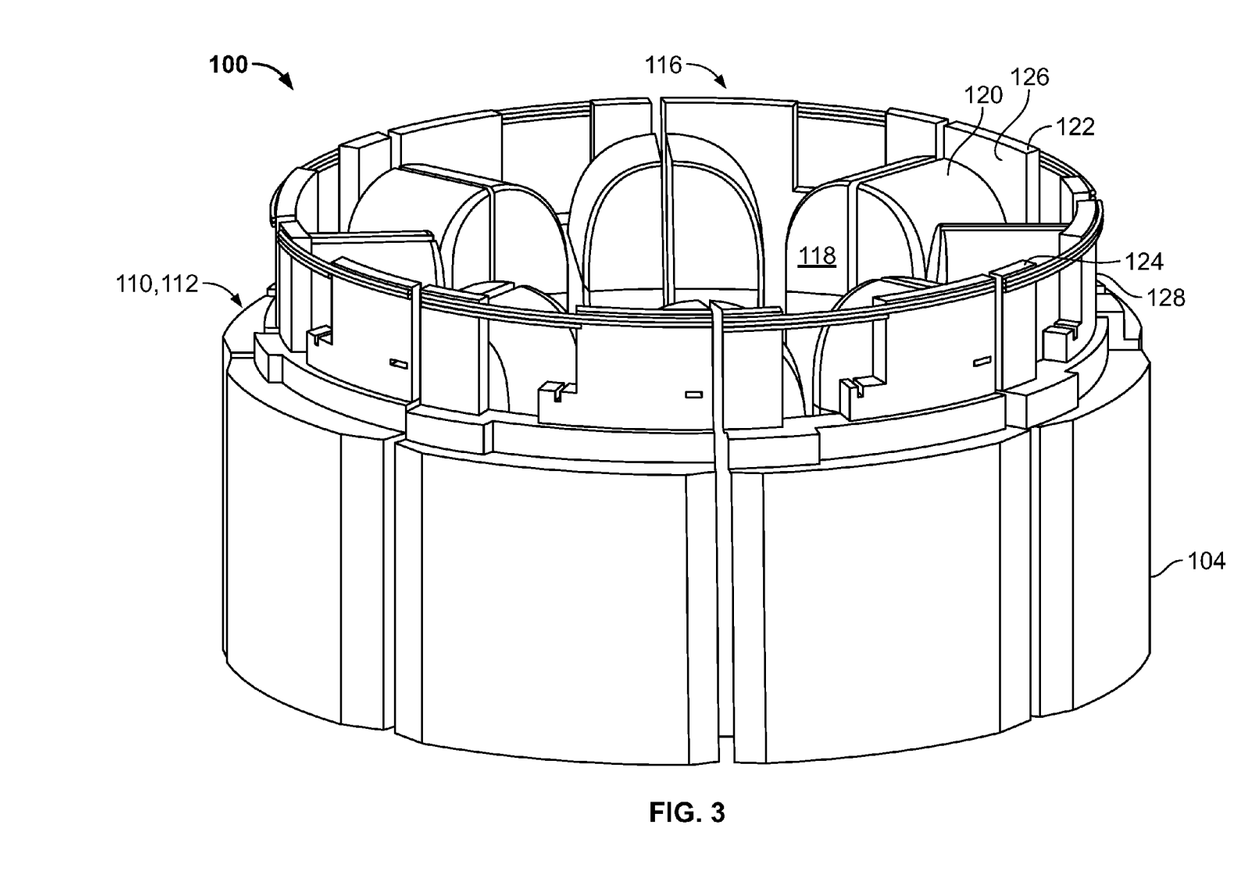
FIG. 3 is a view of a portion of the stator core of shown in FIG. 1.

FIG. 3 illustrates a portion of the stator core 104 shown in FIG. 1 having an end cap 116 positioned on one axial end. The end cap 116 generally includes an inboard tooth wall 118, a tooth portion 120, a yoke portion 122, and wire routing structures 124. The yoke portion 122 includes an inboard wall 126 facing radially inward on the yoke portion 122, and an outboard wall 128 facing radially outward on the yoke potion 122. The wire routing structures 124 generally act to position conducting wires in a desired location and/or to keep the wires in a fixed position in an assembled dynamoelectric machine. These wire routing structures 124 may be located, depending on the type of end cap 116 selected, on the inboard tooth wall 128, the tooth portion 120, the yoke portion 122, the inboard wall 126, and/or the outboard wall 128. While only a single end cap 116 is shown in FIG. 3, it is understood by one of ordinary skill in the art that the end cap 116 may be made from a single piece or assembled from multiple pieces. End cap(s) 116 may also be located one or both axial ends. It is further understood (while not shown) that the end cap 116 may be included on both stators 100 or 102 in a similar manner as described herein.

FIGS. 4 through 7 illustrate example embodiments of phase winding and connection methods of the three phase dynamoelectric machine of the present disclosure. It should be understood that while these figures illustrate windings comprising a single loop of each of the conducting wires about each tooth, in practice multiple loops of the conducting wires about each tooth may be used. Furthermore, any of the conducting wires described herein may made from any suitable material including, but not limited to, copper, copper alloy, aluminum, and/or aluminum alloy, and one or two of the conducting wires may be made from a material different from the other of the conducting wires. While this disclosure describes the use of three conducting wires 129, 130, and 131, it should be understood that any of these three wires may, in some instances, be the same conducting wire as the other two.

Figure 4:
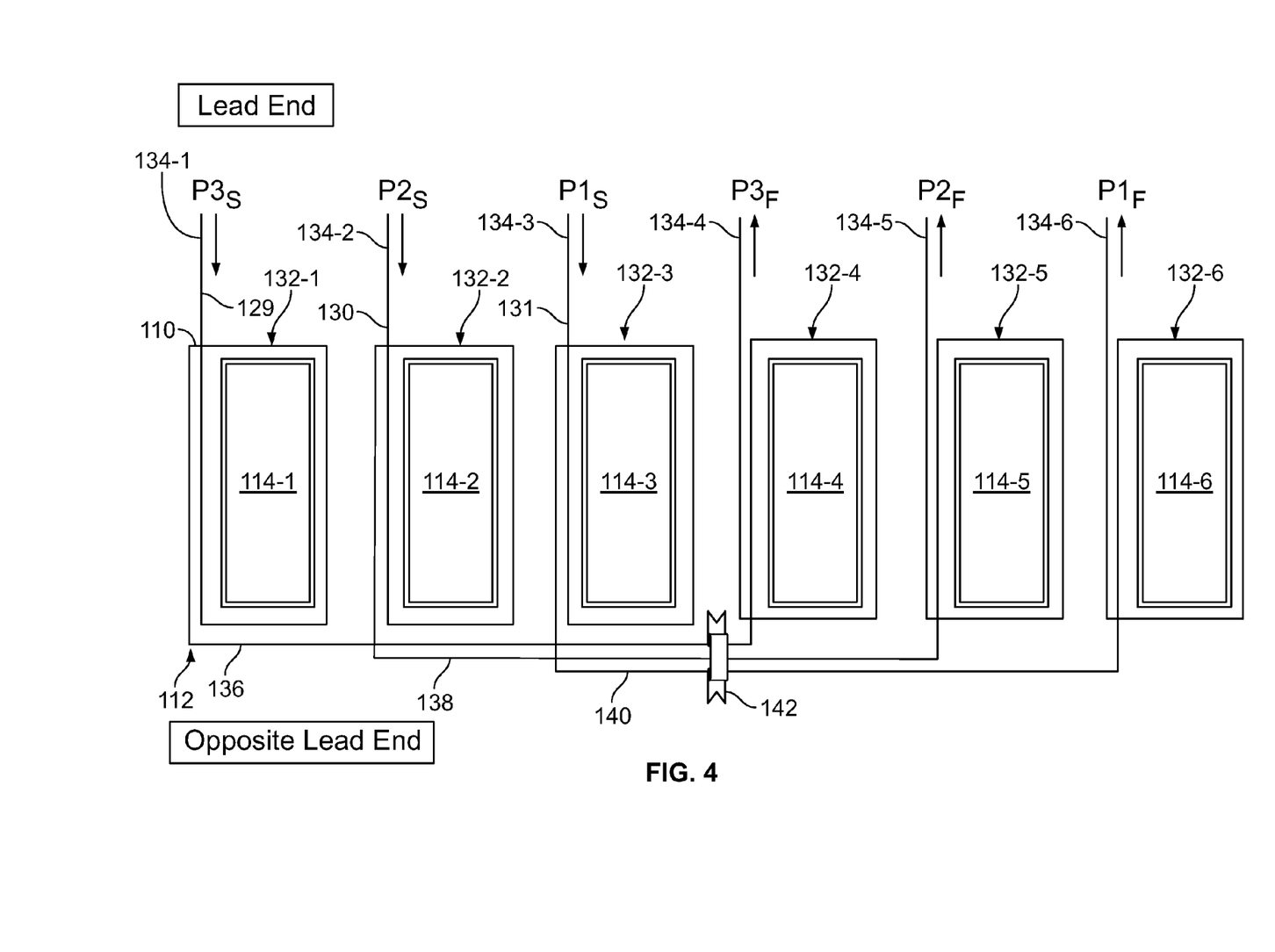
FIG. 4. is a perspective view of one embodiment of the winding and wire routing configuration of the stator of FIG. 1.

FIG. 4 illustrates an example of a winding and wire routing configuration of the stator 100 illustrated in FIG. 1. As previously described, the stator core 104 includes the first axial end 110 and second axial end 112 and six teeth 114-1 through 114-6. As used hereinafter, the first axial end 110 will be called the lead end 110 and the second axial end 112 will be called the opposite lead end 112. A first set of three adjacent phase windings 132-1, 132-2, and 132-3 is formed by wrapping conducting wires 129, 130, and 131 in a first direction about teeth 114-1, 114-2, and 114-3. A second set of three adjacent phase windings 132-4, 132-5, and 132-6 is formed by wrapping, in a second direction opposite the first direction, the conducting wires 129, 130, and 131 about teeth 114-4, 114-5, and 114-6. A lead wire 134-1 though 134-6 extends, respectively, from the lead end 110 of each phase winding 132-1 through 132-6. The lead wires 134-1 though 134-6 may be made from the conducting wire or they may be coupled to the conducting wire by braising or some other method. A first interconnect wire 136 connects winding 132-1 to winding 132-4. A second interconnect wire 138 connects winding 132-2 to 132-5. A third interconnect wire 140 connects winding 132-3 with 132-6. In some embodiments, the interconnect wires 136, 138, and 140 may be formed, respectively, from the conducting wire 129, 130, and 131. In this example, the first, second, and third interconnect wires 136, 138, and 140 are located on the opposite lead end 112 and connected together by a connection 142.

The neutral connection 142 (and all neutral connections described herein) may be a splice connection that penetrates the conducting wires' 129, 130, and 131 insulation and electrically connects the interconnect wires 136, 138, and 140 together. Alternatively, other suitable means of connecting to the interconnect wire 136, 138, and 140 may be used to form the neutral connection 142 (e.g. braising, welding, or crimping).

One method of assembling the stator 100 illustrated in FIG. 4 includes beginning wrapping the electrical conductors 129, 130, and 131 at the lead end 110 of each respective tooth 114-1, 114-2, and 114-3. Next, the conducting wires 129, 130, and 131 are wrapped about each tooth 114-1, 114-2, and 114-3 in a counter clockwise direction to form windings 132-1, 132-2, and 132-3. Without breaking the conducting wires 129, 130, and 131, the wires exit each winding 132-1, 132-2, and 132-3 from its opposite lead end 112, are routed circumferentially in the same direction along the outboard wall 128 of the end cap 116 (forming the interconnect wires 136, 138, and 140), and are wrapped, respectively, in a clockwise direction about teeth 114-4, 114-5, and 114-6. At a location where the interconnect wires 136, 138, and 140 are adjacent and run parallel to each other on the outboard wall 128 of the end cap 116, the interconnect wires are connected together via connection 142. Lead wires 134-1 through 134-6 are connected to the lead end 110 of each phase winding 132-1 through 132-6 (or formed from the conducting wires 129, 130, or 131). Lead wire 134-1 is connected together with 134-4, lead wire 134-2 is connected together with 134-5, and lead wire 134-3 is connected together with 134-6. The connection of the lead wires forms three pairs of parallel windings. One of the windings in each winding pair is indexed 180 degrees from the other winding in the pair.

Figure 5:
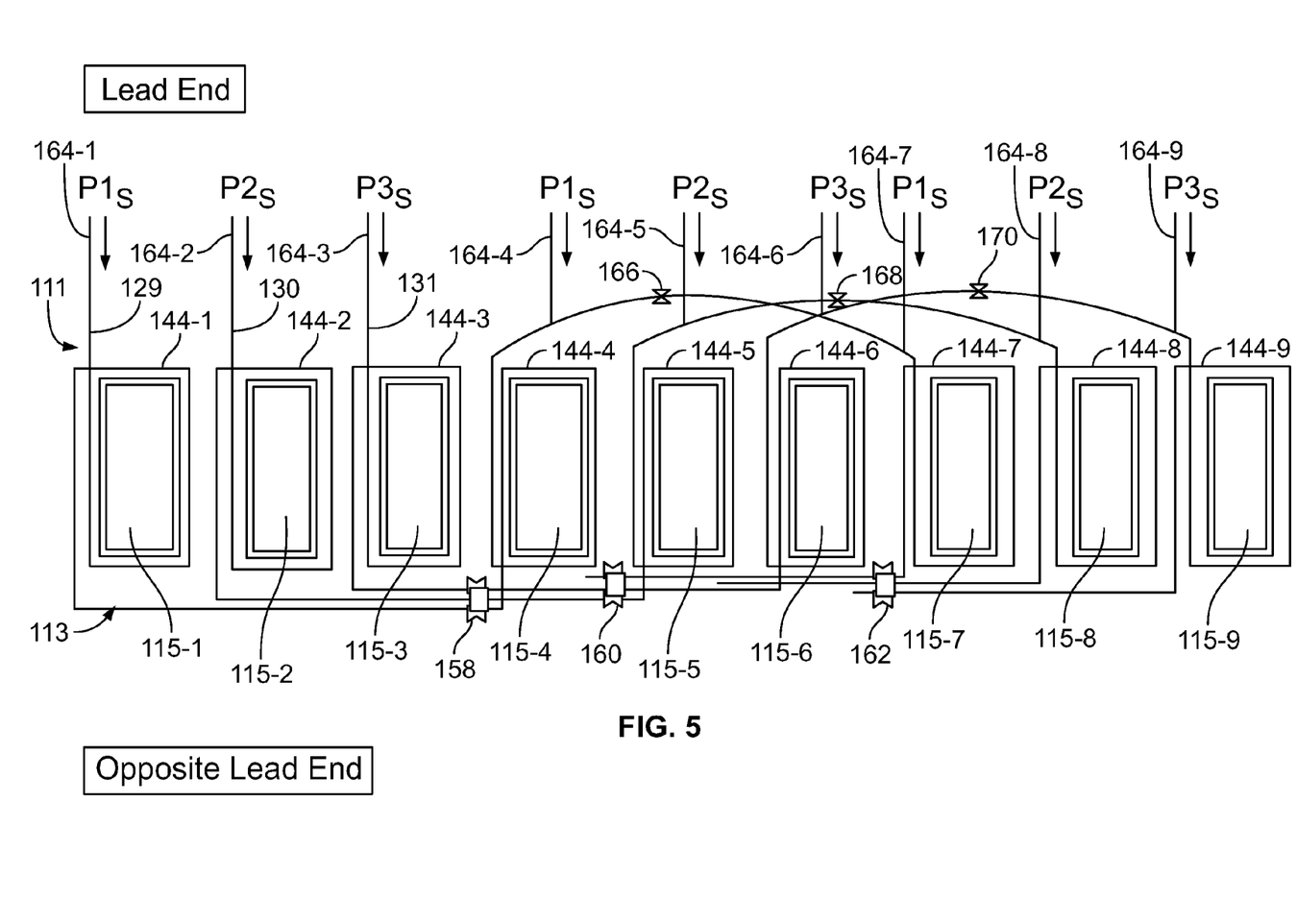
FIG. 5. is a perspective view of one embodiment of the winding and wire routing configuration of the stator of FIG. 2.

FIG. 5 illustrates an example of a winding and connection configuration of the stator 102 illustrated in FIG. 2. As previously described, the stator core 104 includes the first axial end 111 and second axial end 113 and nine teeth 115-1 through 115-9. As used hereinafter, the first axial end 111 will be called the lead end 111 and the second axial end 113 will be called the opposite lead end 113. In present embodiment, a first set of three adjacent phase windings 144-1, 144-2, and 144-3 is formed by wrapping conducting wires 129, 130, and 131 in a first direction about teeth 115-1, 115-2, and 115-3. A second set of three adjacent phase windings 144-4, 144-5, and 144-6 is formed by wrapping, in a second direction opposite the first direction, the conducting wires 129, 130, and 131 about teeth 115-4, 115-5, and 115-6. A third set of three adjacent phase windings 144-7, 144-8, and 144-9 is formed by wrapping, in the first direction, the conducting wires 129, 130, and 131 about teeth 115-7, 115-8, and 115-9.

A first interconnect wire 146 connects winding 144-1 to winding 144-4. A second interconnect wire 148 connects winding 144-2 to 144-5. A third interconnect wire 150 connects winding 144-3 with 144-6. Fourth, fifth, and sixth interconnect wires 152, 154, and 156 extend, respectively, from winding 144-7, 144-8, and 144-9 and back toward the first, second and third interconnect wires. In this embodiment, all of the interconnect wires 146 through 156 are located on the opposite lead end 113. Neutral connections are made by: i) connection 158 connecting the first, second, and third interconnect wires 146, 148, and 150; ii) connection 160 connecting the second, third, and forth interconnect wires 148, 150, and 152; iii) connection 162 connecting the fourth, fifth, and sixth interconnect wires 152, 154, and 156. Lead wires 164-1 though 164-9 may extend from the lead ends 111 of each phase winding 144-1 through 144-6. As described above and for each embodiment described herein, the lead wires and interconnect wires may be formed from the conducting wires forming the phase windings or individual pieces of wire connected to the phase windings.

One method of assembling the stator 102 of FIG. 5 will be described in detail. Leaving an extra length of each conducting wire 129, 130, and 131 at the lead end 111 to form the lead wires 164-1, 164-2, and 164-3, conducting wires 129, 130, and 131 are wrapped about teeth 115-1, 115-2, and 115-3 in a counter clockwise direction to form windings 144-1, 144-2, and 144-3. The wrapping of windings 144-1, 144-2, and 144-3 ends with each conducting wire located at the opposite lead end 113. Without breaking the conducting wires 129, 130, and 131, each wire i) exits windings 144-1, 144-2, and 144-3 from its opposite lead end 113; ii) is routed circumferentially in the same direction along the outboard wall 128 of the end cap 116 to a location adjacent to teeth 115-4, 115-5, and 115-6 on the opposite lead end 113 (forming the interconnect wires 146, 148, and 150), iii) is wrapped, respectively, in a clockwise direction about teeth 115-4, 115-5, and 115-6 until each conducting wire is located on the lead end 111 (forming phase windings 144-4, 144-5, and 144-6); iv) is routed to a location adjacent to teeth 115-7, 115-8, and 115-9 on the lead end 111; v) is wrapped, respectively, in the counter clockwise direction about teeth 115-7, 115-8, and 115-9 until each conducting wire is located on the opposite lead end 113 (forming phase windings 144-7, 144-8, and 144-9); and vi) is routed circumferentially back along the outboard wall 128 of the end cap 116 to a location adjacent to teeth 115-4, 115-5, and 115-6 on the lead end 111 forming interconnect wires 152, 154, and 156.

In this embodiment, interconnect wires 146, 148, and 150 are connected via connection 158 at a location where they are adjacent to and parallel with each other on the outboard wall 128. Interconnect wires 148, 150, and 152 are connected via connection 160 at a location where they are adjacent to and parallel with each other on the outboard wall 128. Interconnect wires 152, 154, and 156 are connected via connection 162 at a location where they are adjacent to and parallel with each other on the outboard wall 128. Lead wires 164-4 and 164-7, 164-5 and 164-8, and 164-6 and 164-9 are formed, respectively by cutting conducting wires 129, 130, and 131 at 166, 168, and 170. Finally, the lead wires i) 164-1, 164-4, and 164-7, ii) 164-2, 164-5, and 164-8, and iii) 164-3, 164-6, and 164-9 may be connected together, to form three sets of parallel phase windings with each phase having a winding indexed 120 degrees from the other windings of that phases.

Figure 6:
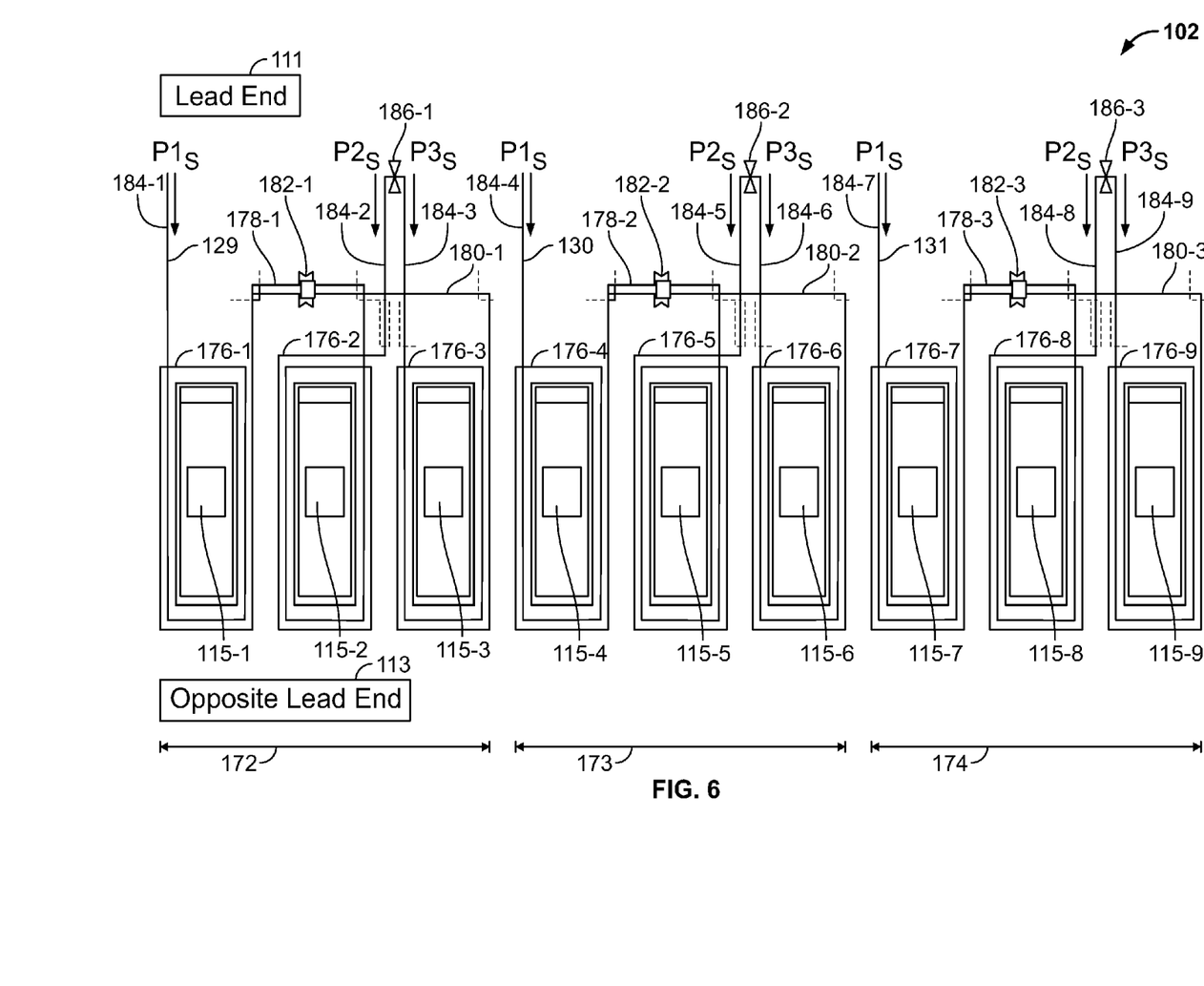
FIG. 6. is a perspective view of one embodiment of the winding and wire routing configuration of the stator of FIG. 2.

FIG. 6 illustrates another example winding and connection configuration of the stator 102 illustrated in FIG. 2. In the present embodiment, the stator 102 includes at least three equivalent sets 172, 173, and 174 of three adjacent phase windings. Each set of phase windings 172, 173, and 174 is formed by wrapping, respectively for each set, the conducting wires 129, 130, 131: i) around teeth 115-1, 115-4, and 115-7 in a first direction to form set 172 having windings 176-1, 176-4, and 176-7, ii) around teeth 115-2, 115-5, and 115-8 in a direction opposite the first direction to form set 173 having windings 176-2, 176-5, and 176-8, and iii) around teeth 115-3, 115-6, and 115-9 in the first direction to form set 174 having windings 176-3, 176-6, and 176-9. For each set of phase windings 172, 173, and 174 in the present embodiment: i) first interconnect wires 178-1, 178-2, and 178-3, all located on one of the lead end 111 or opposite lead end 113, connects respectively phase windings 176-1 and 176-2, 176-4 and 176-5, and 176-7 and 176-8, ii) second interconnect wires 180-1, 180-2, and 180-3 located on the same axial end as the first interconnect wires, extend, respectively, from phase windings 176-3, 176-6, and 176-9 back toward the first interconnect wires 178-1, 178-2, and 178-3; and iii) connections 182-1, 182-2, and 182-3 connect, respectively, the first interconnect wire 178-1, 178-2, and 178-3. Lead wires 184-1 though 184-9 all extend from the same axial end of the phase windings 176-1 through 176-9. In some embodiments, the first phase 184-1, 184-4, and 184-7, second phase 184-2, 184-5, and 184-8, and third phase 184-3, 184-6, and 184-9 lead wires may be connected together to form three sets of parallel phase windings with phase having a winding indexed 120 degrees from the other two windings of that phase.

One method of assembling the stator of FIG. 6 will be described in detail. Because winding sets 172, 173, and 174 have the same winding and connection configuration, only the example winding of set 172 will be described. It should be understood that phases winding sets 173 and 174 may be constructed in a similar manner. Leaving an extra length of the each conducting wire 129 at the lead end 111 to form lead wire 184-1, conducting wire 129 is wrapped counter clockwise about tooth 115-1 to form winding 176-1. Phase winding 176-1 is finished such that the conducting wire 129 extends from the lead end 111 in the space between teeth 115-1 and 115-2. The conducting wire 129 is then routed circumferentially along the outboard wall 128 of the end cap 116 back into the space between teeth 115-2 and 115-3 forming the first interconnect wire 178-1. The conducting wire 129 is wrapped clockwise around tooth 115-2 to form phase winding 176-2. The wrapping of phase winding 176-2 is finished such that the conducting wire 129 extends from the lead end 111 in the space between teeth 115-1 and 115-2. Next, leaving an extra length of conducting wire 129 to be able to form leads 184-2 and 184-3, the conducting wire 129 is routed into the space between teeth 115-2 and 115-3 and wrapped counter clockwise about tooth 115-3 to form phase winding 176-3. The wrapping of phase winding 176-3 is finished such that the conducting wire 129 is located on the lead end side 111 between teeth 115-3 and 115-4. The conducting wire 129 is routed circumferentially along the outboard wall 128 of the end cap 116 on the lead end 111 back to a position adjacent and parallel with the first interconnect wire 178-1 (forming the second interconnect wire 180-1). Then, the first and second interconnect wires 178-1 and 180-1 are connected via connection 182-1 and conducting wire 129 is cut at 186 to form lead wires 184-2 and 184-3. While not specifically described it should be understood that phases winding sets 173 and 174 may be constructed in similar fashion to form stator 102 including three sets of three phase windings with each winding is indexed 120 degrees from the other windings in its winding set.

Figure 7:
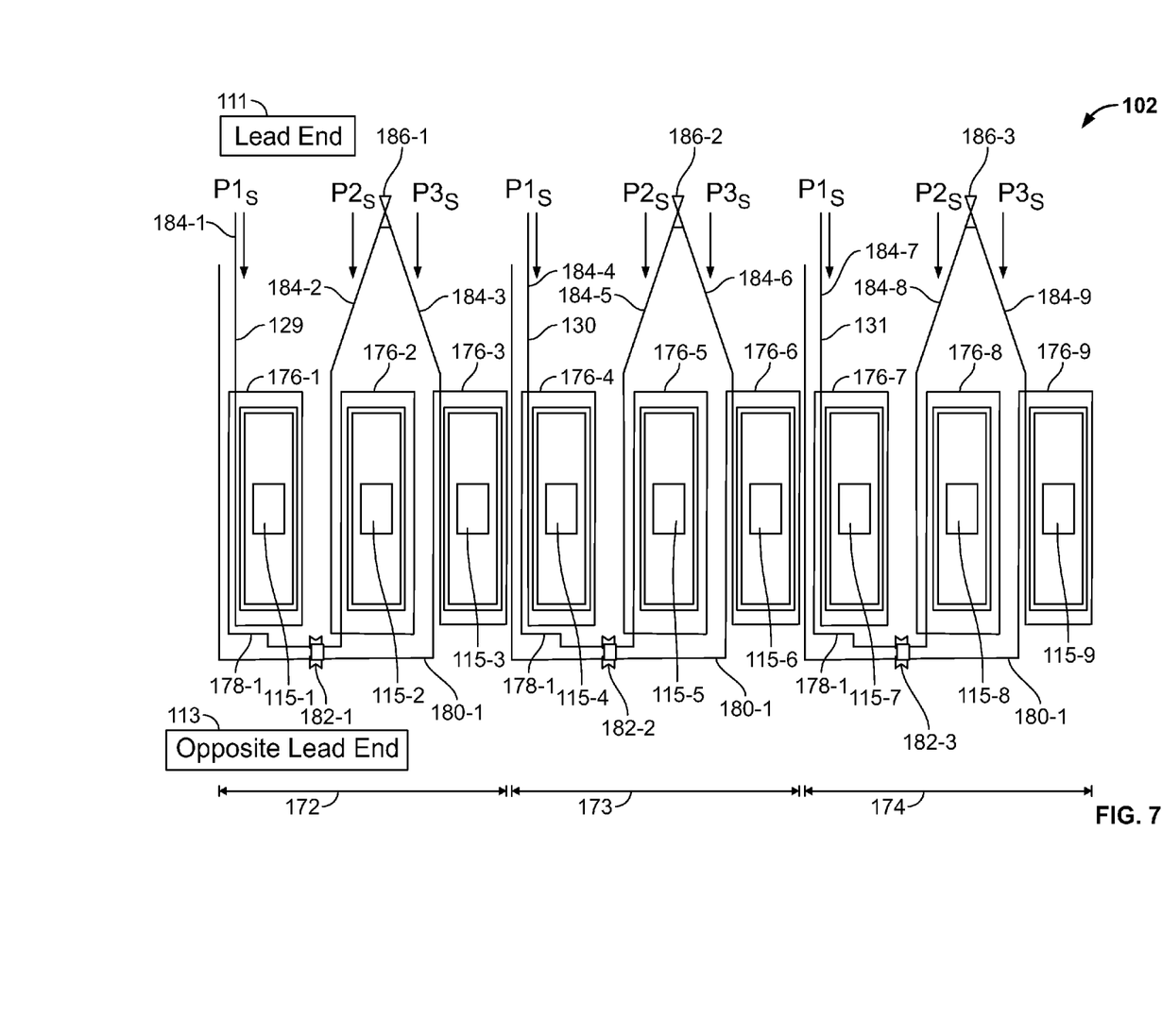
FIG. 7. is a perspective view of one embodiment of the winding and wire routing configuration of the stator of FIG. 2.

FIG. 7 illustrates another example of a winding and connection configuration of the stator described in FIG. 6 but with interconnect wires 178 and 180 and connection 182 located on the opposite lead end 113. In this embodiment, conducting wire 129 is wrapped counter clockwise around tooth 115-1 to form phase winding 176-1. Phase winding 176-1 is finished such that conducting wire 129 extends from the opposite lead end 113. The conducting wire 129 is then routed circumferentially along the outboard wall 128 of the end cap 116 back into the space between tooth 115-1 and 115-2 on the opposite lead end 113 forming the first interconnect wire 178-1. The conducting wire 129 is then wrapped clockwise around tooth 115-2 to form phase winding 176-2. Phase winding 176-2 is finished such that the conducting wire 129 extends from space between teeth 115-1 and 115-2 on the lead end 111 side. Next, leaving an extra length of conducting wire 129 to be able to form leads 184-2 and 184-3, the conducting wire 129 is routed into the space between teeth 115-2 and 115-3 on the lead end side 111 and wrapped counter clockwise about tooth 115-3 to form phase winding 176-3. Phase winding 176-3 is finished such that the conducting wire 129 exits the space between teeth 115-2 and 115-3 on the opposite lead end side 113 and is routed circumferentially along the outboard wall 128 of the end cap 116 back to a position adjacent to and parallel with the first interconnect wire 178-1 (forming the second interconnect wire 180-1). Finally, the first and second interconnect wires 178-1 and 180-1 are connected via connection 182-1. While not specifically described detail, because each set of phase windings 172, 173, and 174 are identically wound and connected, it should be understood that the phases winding sets 173 and 174 of FIG. 7 may be constructed in similar fashion as set 172.

Figure 8:
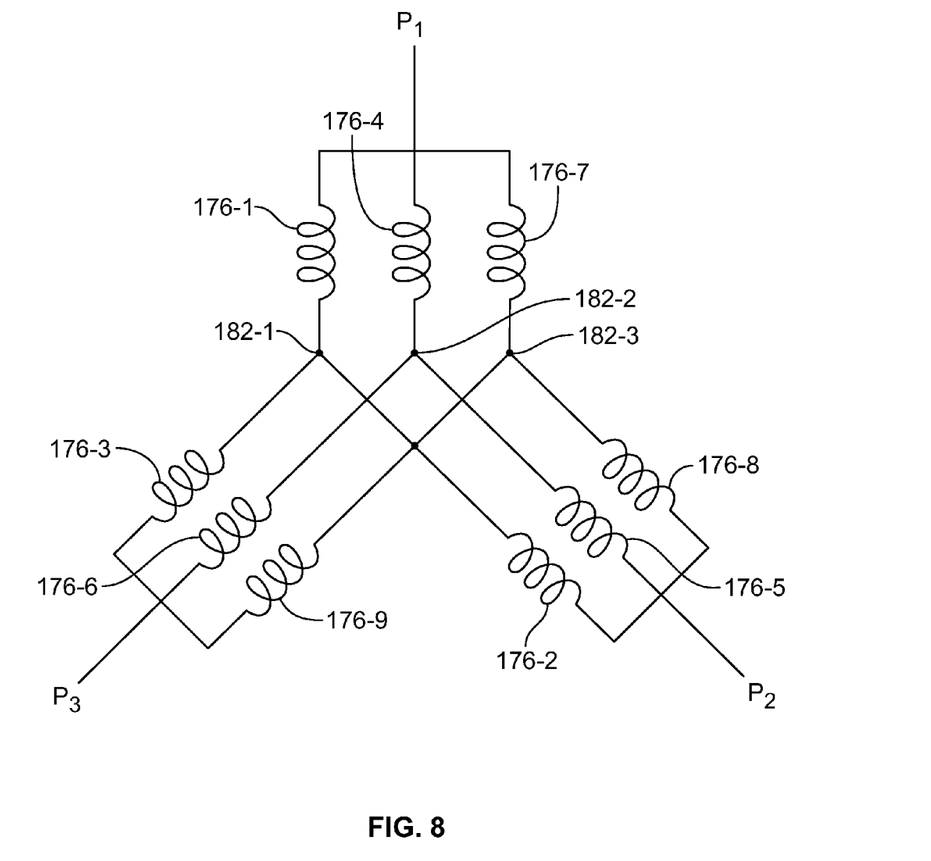
FIG. 8 is a connection diagram of the stators of FIGS. 6 and 7.

FIG. 8 illustrates a winding connection diagram for the stators described in FIGS. 6 and 7. As illustrated in the drawing, neutral connections 182-1, 182-2, and 182-3 "float." That is, the neutrals are not connected to one another.

One advantage of winding and connecting the stators as shown in FIGS. 6 and 7 is that a needle winder with three needles indexed 120 degrees apart maybe used to wind the three sets of three adjacent phase windings 172, 173, and 174. With the needles indexed 120 degrees apart, the winder may wind all of the windings of the first phase, then all of the windings of the second phase, and then all of the windings of the third phase. For example, as shown in FIG. 8, windings 176-1, 176-4, and 176-7 may be wound together, 176-2, 176-5, and 176-8 may be wound together, and 176-3, 176-6, and 176-9 may be wound together. Indexing the needles 120 degrees apart may also balance the needle winder as it loops the conducting wire about the stator teeth. One advantage of using a balanced needle winder is that it allows for the wrapping speeds to be increased as compared to needle winders wrapping three adjacent stator teeth at a time. While this section describes the advantages of using a needle winder with needles indexed 120 degrees apart, it should be understood that the order or method of winding of each phase winding is not limited. For example, each phase winding may be wound individually or in groups of two, three, four, etc. In some instances, phase windings from different adjacent sets may be wound together. Hand winding, and other suitable means of winding motors, may also be used.

Figure 9:
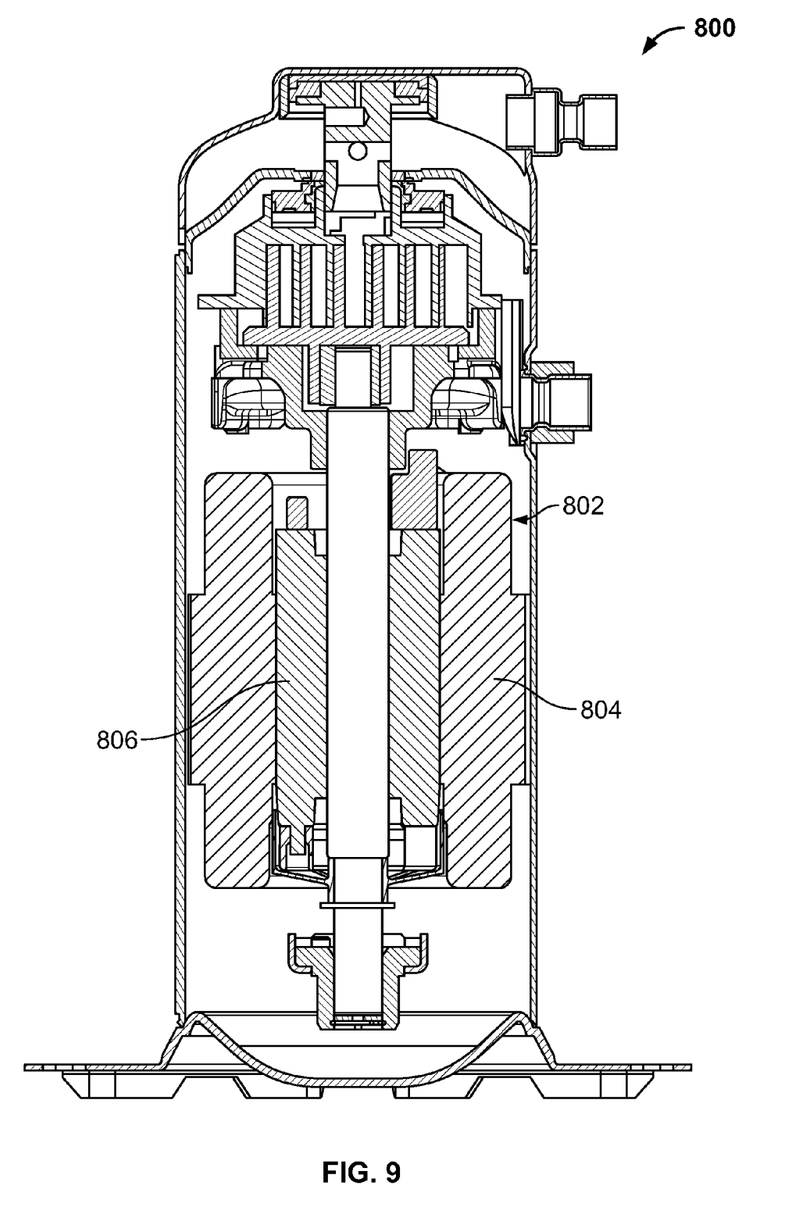
FIG. 9 is an exemplary illustration of a scroll compressor including the stators described herein.

FIG. 9 is an exemplary illustration of a scroll compressor assembly 800. The scroll compressor assembly may include any of the stators 100 and 102 described herein at located at 804. A rotor 802 may be displaced coaxially within the stators 100 and 102. The scroll compressor assembly 800 may be used to compress refrigerant in an air conditioning system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A stator for a three phase dynamoelectric machine, the stator comprising:

a stator core having a plurality teeth radially distributed about a central axis and axially opposing first and second ends; and at least three equivalent sets of three adjacent phase windings, each set of three adjacent phase windings comprising:

a conducting wire wrapped around i) its first tooth in a first direction to form a first winding, ii) its second tooth in a direction opposite the first direction to form a second winding, and iii) its third tooth in the first direction to form a third winding;

a first interconnect wire extending between the first winding and the second winding, the first interconnect wire located on one of the first or second axial ends;

a second interconnect wire extending from the third winding on the same axial end as the first interconnect wire back towards the first interconnect wire;

a connection connecting the first and second interconnect wires.

2. The stator of claim 1, further comprising:

at least one end cap including a body portion with an outboard wall, the at least one end cap located on same axial end as the first and second interconnect wires, wherein a portion of the first and second interconnect wires are located on the outboard wall.

3. The stator of claim 1, wherein, for each set of three adjacent windings, the first and second interconnect wires are formed, respectively, from the conducting wire.

4. The stator of claim 1, further comprising a lead wire extending from the first axial end of each winding, wherein, for each set of three adjacent windings, all of the lead wires extending from each set's first winding are coupled together, all of the lead wires extending from each set's second winding are coupled together, and all of the lead wires extending from each set's third winding are coupled together.

5. The stator of claim 1, wherein the first and second interconnect wires in each set of three adjacent windings are located on the first axial end.

6. The stator of claim 1, wherein the first and second interconnect wires in each set of three adjacent windings are located on the second axial end.

7. The hermetic scroll compressor comprising a stator of claim 1.

* * * * *